July 7, 1953  L. C. MILLER  2,644,199
METHOD OF LINING BEARINGS WITH MOLDED BUSHINGS
Filed Sept. 5, 1950

INVENTOR.
LESTER C. MILLER
BY John W. Michael
ATTORNEY

Patented July 7, 1953

2,644,199

UNITED STATES PATENT OFFICE 2,644,199

METHOD OF LINING BEARINGS WITH MOLDED BUSHINGS

Lester C. Miller, Milwaukee, Wis., assignor to E. R. Wagner Manufacturing Company, Milwaukee, Wis., a corporation of Wisconsin Application September 5, 1950, Serial No. 183,168

1 Claim. (Cl. 18—59)

This invention relates to improvements in the method of making bearings, particularly of the type having a metallic shell and a non-metallic synthetic bushing.

Bearings of this type have been made by pressing previously moulded synthetic bushings made of high molecular weight polymides, such as described in U. S. Patent 2,246,086, or of high molecular weight ethylene polymers, such as described in U. S. Patent 2,246,092, into a metal shell. Such synthetic bushings are made by a comparatively expensive injection moulding process requiring the use of a multiplicity of expensive dies in order to produce a variety of shapes and sizes of bearings.

It is an object of this invention, therefore, to provide a bearing having a synthetic bushing which is comparatively inexpensive to manufacture and may be readily made in a variety of sizes.

This object is obtained by forming lengths of standard commercial sections of extruded synthetic material, such as above described, into circles or rings of predetermined size, placing such rings in a die, a part of which die consists of the metallic shell of the bearing, and applying, without additional heat, sufficient pressure on such die to impact mould said ring within said metallic shell into the final shape desired. The bearing so formed is inexpensively made because of the comparatively low cost and availability of standard extruding forms, such as rods, squares, rectangles, or ribbons, and because the assembly step is also the moulding shaping step.

The novel features which are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
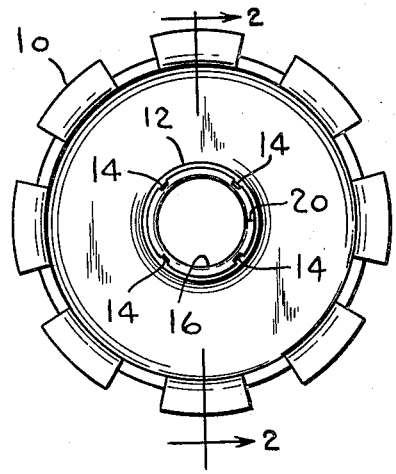
Fig. 1 is a view in front elevation of a bearing embodying the present invention.
Figure 2:
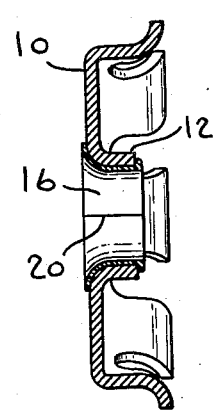
Fig. 2 is a sectional view taken on line 2—2 of Fig. 1.
Figure 3:
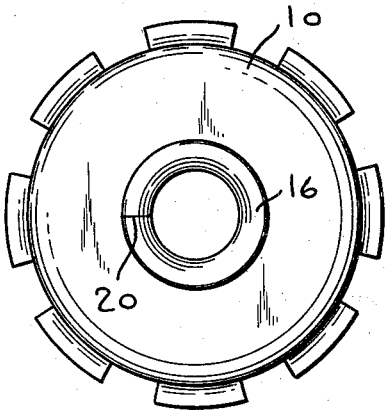
Fig. 3 is a view in rear elevation of the bearing viewed in Fig. 1.

The bearing described herein consists of an outer metallic shell 10 and a non-metallic synthetic bushing 16. Because of the particular shape of this shell, the bearing is adapted for use in connection with light-weight wheels such as are used for baby carriages, children's velocipedes, and the like. However, various shapes of shells may be used depending upon the ultimate purpose for which the bearing is to be used. The important common characteristic of all shells is the bushing support or neck 12 of hollow cylindrical shape centrally located in the shell. This provides radial support for the bushing for sufficient length to provide suitable bearing area. The shell 10 is a punched metal part made in a well-known manner with suitable tools and presses which form the neck 12 as the shell is made. It may be desirable to provide ears 14 which project from one edge of the neck 12. These ears interlock with the synthetic bushing 16 to prevent relative rotation between shell and bushing. The non-metallic synthetic bushing 16 is impact moulded within the neck 12 to the shape shown in the manner hereinafter described. It is made from material known to the trade as nylon and is obtained from E. I. du Pont de Nemours & Co. (Inc.). In its completed shape the bushing 16 is curled about its longitudinal axis with its sides abutting in a longitudinally extending seam 20. It has a central tubular part with relatively thin wall sections which lie against and are radially supported by the inner surface of the neck 12. The front end of the bushing has a small diameter retaining flange and its rear end has a larger diameter retaining flange. These flanges engage opposite ends of the neck 12 and support the bushing against longitudinal displacement with respect to such neck.

The combined mould and forming tool used for impact moulding the non-metallic bushing 16 within the neck 12 will now be described. One of the elements of the mould and tool is a punch 22 which has a tip shaped to provide both the large diameter flange and the inside diameter of the bushing. A pressure pad 24 supported in a well-known manner slides relatively to the punch 22 and has a recess 26 which receives the metallic shell 10 in such a way that the neck 12 becomes a part of the mould. As the neck 12 is a part of the completed mould it is desirable to provide a circumferential ring 28 on the upper end of the punch-receiving opening in the pressure pad 24. The purpose of this ring is to equalize pressures along its top and thus provide a tight seal between the end of the neck 12 and the pad 24 to prevent the non-metallic bushing material from flowing therebetween and forming undesirable flashing. Another element of the mould and tool is a die ring 30 which fits within the metallic shell 10 in such a way as to provide support for the neck 12 during impact moulding. A sleeve 32 mounted within the ring 30 has an opening 34 which tightly receives the tip of the punch 22. When the tip is in such opening far enough to make a seal therebetween the mould is closed. A shoulder 35 on the sleeve 32 determines the distance between the bottom of the sleeve 32 and the top of the neck 12 when the mould and tool with the shell therein is in fully closed position. This distance controls the thickness of the small retaining flange on the front end of the bushing. As is customary with this type of tool, stripper pins 36 may be provided by which the completed bearing may be ejected from the die ring. The pressure pad 24 also acts as stripper when the punch 22 is moved downwardly relative thereto and pulls the completed bearing from the tip of the punch. In accordance with well-known practice, the different parts of the tool may be made from metals having characteristics designed to provide good seals therebetween and still have a long useful life.

Figures 4, 5:
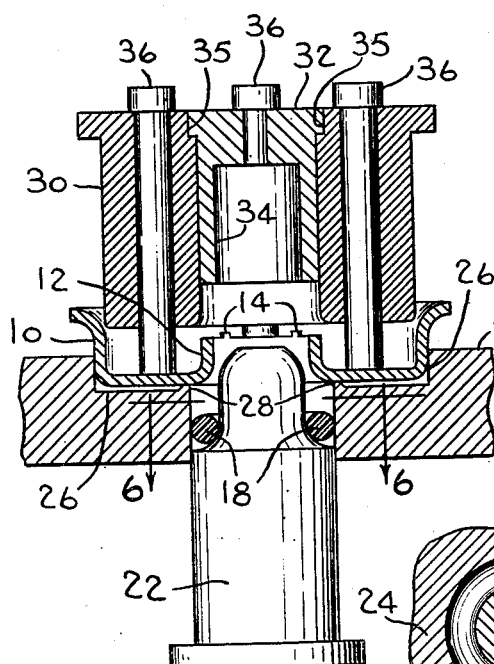
Fig. 4 is a fragmentary sectional view of the tool by which the synthetic bushing is impact moulded within the metallic shell with the parts shown prior to the pressing operation.
Fig. 5 is a view similar to Fig. 4 with parts shown in the relative position assumed when the impact has been completed.
Figure 6:
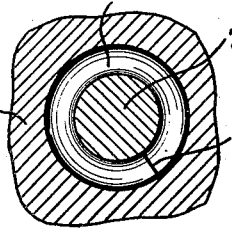
Fig. 6 is a fragmentary sectional view taken on line 6—6 of Fig. 4.

The first step in making a bearing with the mould and tool as described is to pre-form a ring 18 of the synthetic material heretofore described. In this particular embodiment of the invention such ring is made from an extruded rod of nylon of a commercial size available for purchase from stock on the open market. The rod is bent around a mandrel until a ring is formed and then such ring is cut from the rod. The ring so formed has an inside diameter sufficient to permit the ring to fit over the tip of the punch 22 and an outside diameter small enough to permit the ring to fit within the punch opening in the pressure pad 24. The second step is to place the ring 18 on the tip of the punch 22 while the tool is open and before the metallic shell 10 is put in place. Next the metallic shell 10 is placed in the recess 26 over the ring 18 as shown in Figs. 4 and 6. Then impact pressure is applied so that the die ring 30 and sleeve 32 properly seat within and against the shell 10 and force it against the pressure pad 24. There is sufficient resistance applied to the pressure pad 24 by way of springs or other instrumentality (not shown) to effectively cause such seating action. Thereafter continuation of such pressure causes the die ring 30, sleeve 32, shell 10, and pressure pad 24 to move as a unit relative to the punch 22. The tip of the punch is forced into the sleeve 32 applying pressure to the ring 18 and closing the mould. While no outside heat is added, the pressure and the resultant heat created solely thereby are enough to cause the synthetic material in the ring 18 to become sufficiently fluid so that such material flows while in the mould and assumes the new shape of the bushing 16 shown in the drawings. In the completed bushing the seam 20 only elongates and does not disappear. This indicates that the material does not become fluid enough to run together as would be the case if a bushing were made by the high temperature injection moulding process. However, there are some flash edges on the bushing 16 as completed and this indicates that the material while being impact moulded is fluid enough to attempt to flow out of any crevices or spaces between adjoining sections of the mould. During the impact moulding the material which flows into the small diameter flange of the bushing 16 forms around the ears 14 and thus provides a good interlock between such bushing and the shell preventing relative rotation therebetween. As the neck 12 and its ends are a part of the mould the material of the bushing 16 rests snugly against the surface of the neck 12. This makes a tight fit between the bushing and the shell so that the bushing is supported both radially and longitudinally.

It is not essential to this invention that the ring 18 be formed from extruded rod. Other standard commercially extruded sections may be used such as ribbon, hexagonal, or bar. The only requirement is to have enough cubic area in the ring 18 to substantially fill the cubic area of the closed mould in order to make the desired new form of bushing. The cost of standard commercially extruded sections of the synthetic material plus the labor of impact moulding as here described is considerably less than the cost of making a synthetic bushing by the injection moulding process. This is so whether such bushing is injection moulded into a special metal shell or made separately and spring-forced into place with a metal shell. The bushing described herein cannot be made from synthetic material in the powder form without more expensive type of tools and the special application of additional heat. The necessity of such additional heat is not only expensive of itself but it increases the moulding time per unit. The steps of this invention—shaping standard stock into a ring and impact moulding such ring into the desired shape of bushing using the metallic shell as part of the mould—are relatively few, simple, and rapidly performed, and, therefore, produce an inexpensive highly efficient bearing.

Although only one embodiment of the invention is shown and described herein, it will be understood that this application is intended to cover such changes or modifications as come within the spirit of the invention or scope of the following claim.

I claim:

The method of making a bearing comprising forming a section of nylon rod into a split ring, placing said split ring on the tip of a punch, forcing said tip into a metallic neck while applying reactive pressure on said neck to cause the synthetic material in said ring to flow and form a split bushing having a hollow cylindrical portion within said neck and retaining flanges at each end of said neck.

LESTER C. MILLER.

References Cited in the file of this patent

UNITED STATES PATENTS

| Number | Name | Date |
|---|---|---|
| 1,099,716 | Neuberth | June 9, 1914 |
| 1,477,094 | Wilson | Dec. 11, 1923 |
| 1,760,234 | Frederick | May 27, 1930 |
| 1,923,892 | Skillman | Aug. 22, 1933 |
| 2,246,086 | Austin | June 17, 1941 |
| 2,297,309 | Limbert | Sept. 29, 1942 |
| 2,307,874 | Bilde | Jan. 12, 1943 |
| 2,366,274 | Luth | Jan. 2, 1945 |
| 2,459,598 | Stott | Jan. 18, 1949 |